July 30, 1963 N. B. WRIGHT 3,099,416
REMOVABLE VEHICLE POWERED WINCH OR PULLEY
Filed July 27, 1960 2 Sheets-Sheet 1

Newell B. Wright
INVENTOR.

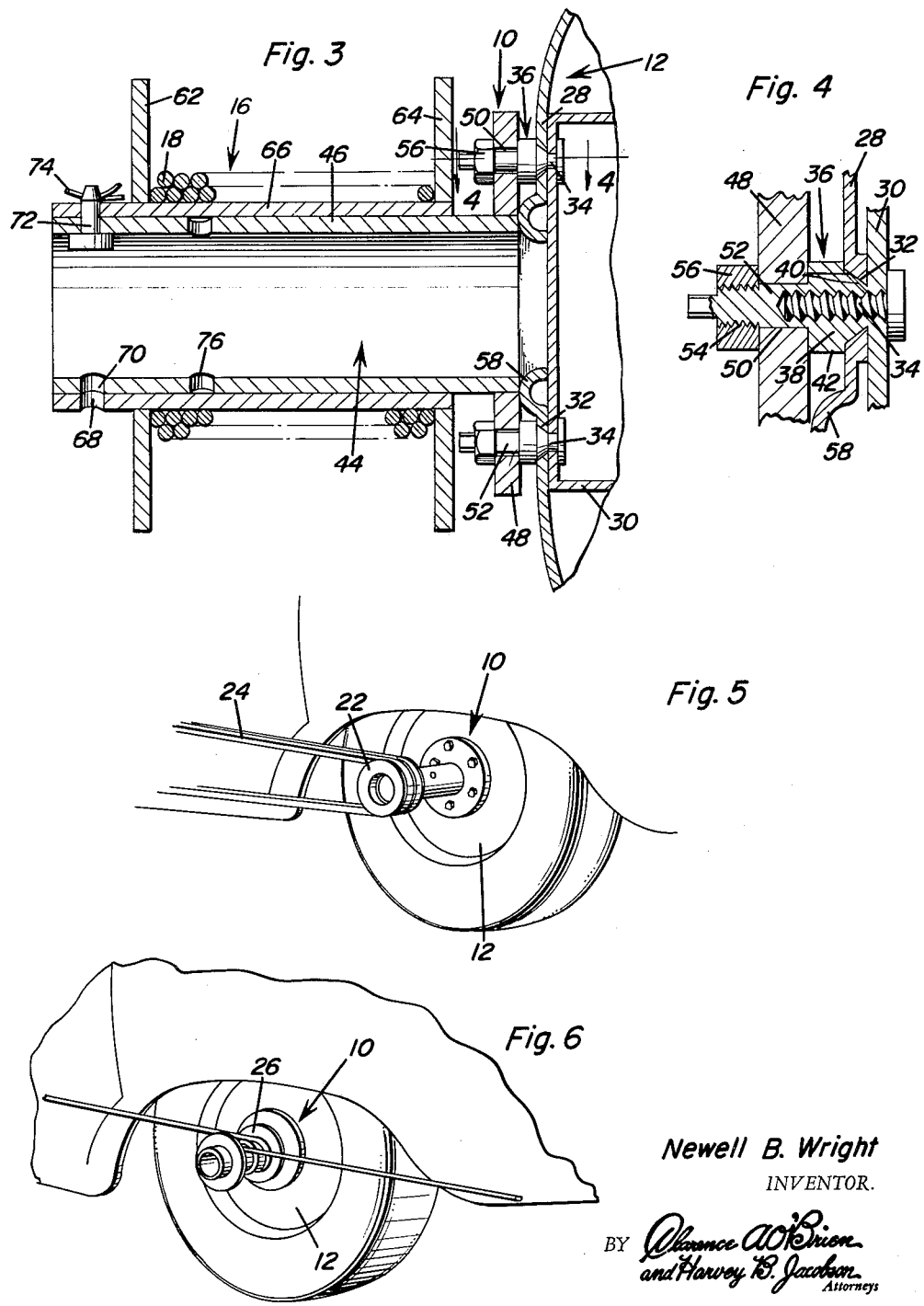

United States Patent Office 3,099,416
Patented July 30, 1963

3,099,416
REMOVABLE VEHICLE POWERED WINCH
OR PULLEY
Newell B. Wright, 498 Aurora Ave., Grants Pass, Oreg.
Filed July 27, 1960, Ser. No. 45,685
8 Claims. (Cl. 242—95)

This invention relates to an attachment that may be applied to the power traction wheel of a vehicle and the mounting thereon of a winch drum, pulley or the like.

The powered wheels of a vehicle such as the rear wheels of an automobile have often in the past been used as a source of motive power for various purposes. For example, by mounting of a winch drum on the rear wheel of a vehicle and by anchoring one end of the cable unwound from the winch drum into solid ground upon rotation of the rear wheels to wind the cables, the automobile may accordingly be withdrawn from the location in which the rear wheels have lost their tractive ability. Also, the rear vehicle wheels have been used for power take-off purposes by the mounting of a drive pulley thereon while said rear powered vehicle wheels have also been used to mount a capstan thereon. This invention is therefore concerned with the problem involved in mounting of such powered wheel assemblies on the powered traction wheel of a vehicle and is particularly concerned with the situation in which such wheel mounting must be readily connected and disconnected when no special tools are available and without any modification of the vehicle wheel construction or assembly.

It is therefore a primary object of this invention to provide a winch drum attachment for the powered traction wheels of a vehicle that may be immediately installed without any special tools with the winch drum capable of being readily rotatively connected and disconnected from the traction wheels as needed or required.

Another object of this invention is to provide a winch drum attachment for a powered vehicle traction wheel which includes a winch drum mounting shaft assembly that may be readily mounted in centered axial alignment with the vehicle traction wheel without the use of special tools.

A still further object of this invention is to provide a powered vehicle traction wheel attachment including the supporting shaft assembly for the winch drum which supporting shaft assembly may also be used for mounting thereon other V-belt drives, drag line wheels or capstans and wire fence reels, etc.

An additional object of this invention is to provide an attachment for powered vehicle traction wheels having the attributes hereinabove indicated and yet being of such a novel and efficient arrangement as to make the attachment economically feasible and available to all.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a sectional view taken through a plane indicated by section line 3—3 of FIGURE 1.

FIGURE 4 is a sectional view taken through a plane indicated by section line 4—4 in FIGURE 3.

FIGURE 5 is a perspective view showing a V-belt mounted pulley on the attachment.

FIGURE 6 is a perspective view showing a capstan mounted on the attachment.

Figure 1:
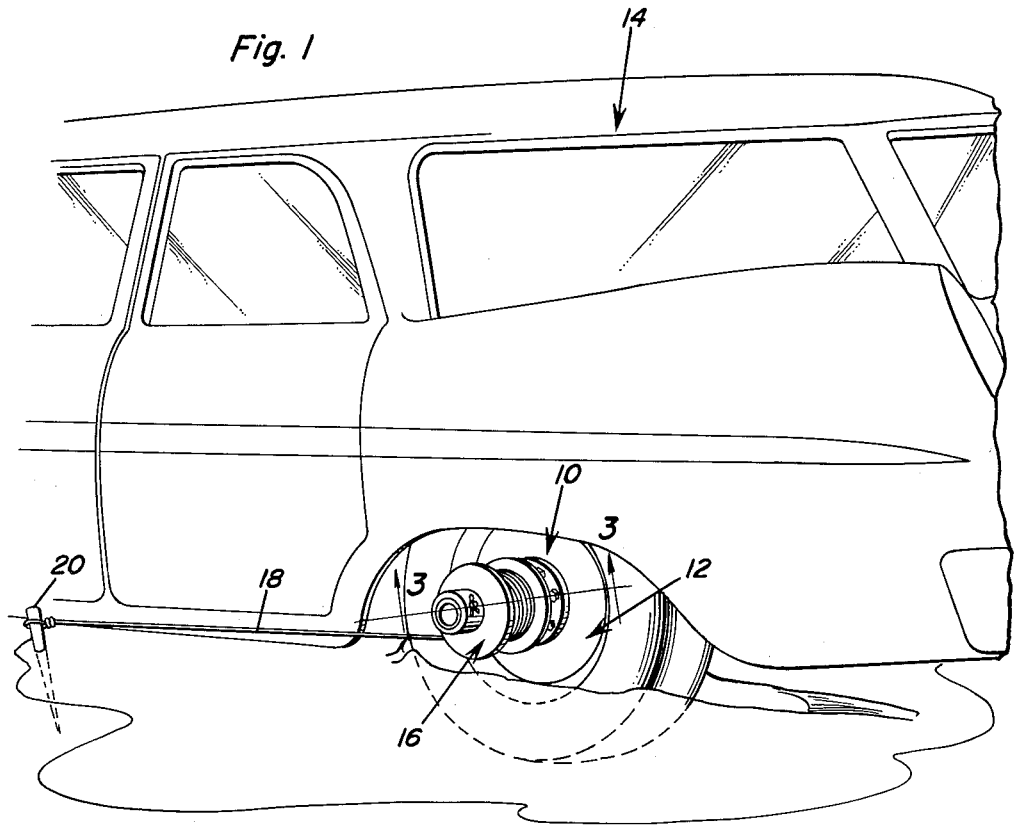
FIGURE 1 is a perspective view of the winch drum attachment to a powered vehicle traction wheel in accordance with this invention.

Referring to the drawings in detail, FIGURE 1 illustrates an important utility for the attachment generally indicated by reference numeral 10, said attachment being mounted on a vehicle traction wheel 12 for a vehicle 14. As shown in FIGURE 1, a winch drum assembly or any similar rotatable device 16 is rotatably connected to the vehicle traction wheel 12 so that the cable 18 which is anchored at one end within the ground by anchor 20 may draw the vehicle 14 from ice or snow or mud in which the rear wheels 12 have become lodged and accordingly have lost their tractive power, by means of winding up the cable 18 upon the winch drum 16. In connection with the preceding, it will be appreciated that if the vehicle includes the conventional type of differential a winch drum 16 will have to be mounted on both rear wheels and cable connected thereto and anchored on both sides of the vehicle in order to accomplish its intended purposes. If on the other hand, the vehicle has a locking type differential, only one winch drum and cable anchor will be required in order to withdraw the vehicle from the location in which the rear wheels have lost their tractive power. Also, as previously noted that attachment 10 may also be used to mount thereon a V-belt type pulley 22 drivingly connected to a power take-off drive belt 24 as illustrated in FIGURE 5. In FIGURE 6 an additional use for the attachment 10 is illustrated, said attachment 10 being used to mount a capstan 26 on the traction wheel 12.

Figure 2:
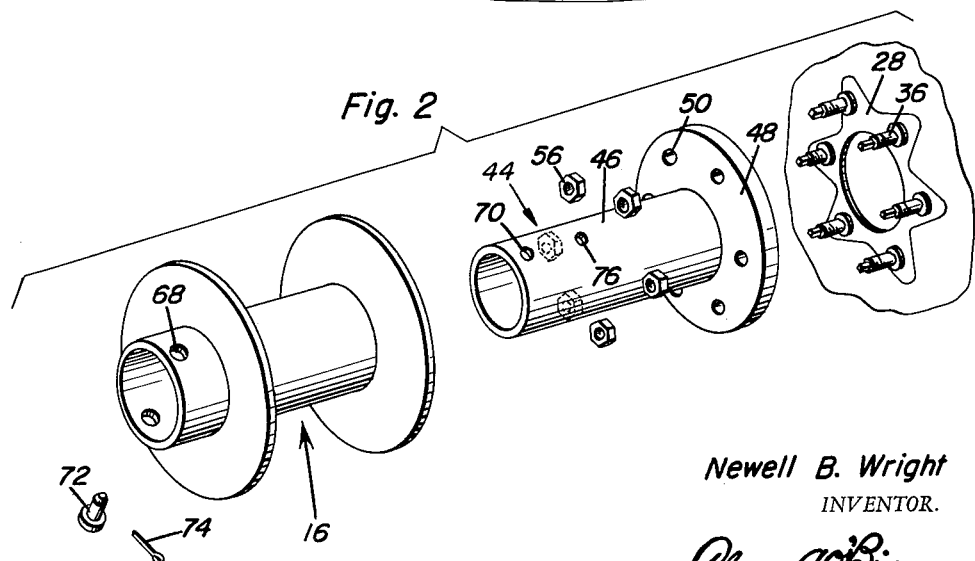
FIGURE 2 is a perspective view of the disassembled parts of the attachment.

For the purposes of the description, the invention will be described with reference to its use for mounting of a cable winch drum on the vehicle traction wheels. Referring therefore to FIGURES 2, 3 and 4 it will be observed that the attachment 10 is mounted on the inner rim portion 28 of the traction wheels 12, said inner rim portion 28 being mounted on the wheel brake drum 30 in the usual manner which includes the provision of a plurality of circumferentially spaced apertures 32 on the wheel portion 28 through which a plurality of threaded bolt members 34 extend, said bolt members also extending through apertures in the brake drum 30 aligned with apertures 32, to thereby carry the wheels 12 thereon. Accordingly, the inner rim portion 28 of the wheel is ordinarily covered by the wheel hub cap which must be removed in order to apply the attachment 10 to the wheel 12.

Referring therefore to FIGURE 4, it will be observed that the usual type of lug nuts that would be threadedly engaged with the threaded bolts 34 for locking the wheel portion 28 on the brake drum 30 are replaced by assembling means including a plurality of mounting assembly members generally indicated by reference numeral 36. Each member 36 includes an internally threaded head portion 38 which includes a tapered portion 40. The head portion 38 therefor, when threadedly engaged with the bolt 34 will engage the aperture 32 by means of its tapered portion 40 so as to center the wheel portion 28 and the wheel 12 on the bolts 34 connected to the brake drum 30. It will be observed therefore that the head portion 38 also includes a shoulder 42 which abuts against the wheel portion 28 in order to lock it against the brake drum 30 once the wheel portion 28 has been centered by means of the tapered portion 40. Accordingly, the wheel 12 may be conditioned for mounting of the attachment 10 thereon by replacing the conventional type of lock nut member by the member 36 as hereinabove described. The hub cap for the wheel 12 may then be replaced over the wheel when the attachment is removed therefrom leaving however the special mounting members 36 thereon in place of the conventional lock nut members. Accordingly, the attachment may be mounted with great dispatch upon removal of the hub cap.

It will be observed in FIGURE 3, that the members 36 may mount thereon support shaft means generally indicated by reference numeral 44, said support shaft means 44 including a tubular cylindrical member 46 which has attached thereto at an inner end thereof a mounting flange 48 which contains a plurality of circumferentially spaced apertures 50 which are aligned with the members 36 for mounting of the supporting shaft assembly 44 on the members 36 in order to mount the shaft assembly on the wheel 12 in coaxial relation thereto. The members 36 therefore include a shaft portion 52 which extends through the apertures 50 on the mounting flange 48 as more clearly seen in FIGURE 4. A threaded portion 54 is therefore provided at the outer end of the shaft portion 52 so that the mounting flange 48 may be clamped between the shoulders 42 on the members 36 and nut members 56. It will therefore be observed that the mounting flange 48 of the shaft supporting assembly 44 will be spaced from the wheel 12 by means of the shoulder portion 42 on the members 36. The spacing of the shoulder portions 42 are such as to provide clearance between the mounting flange 48 and the wheel 12 so as to accommodate any type of rib or convolution on the inner portion of the vehicle traction wheels for the various different makes of vehicles, such ribs or projections being indicated in FIGURE 3 by reference numeral 58. In connection with the combination of the instant attachment 10 for the various different types and makes of vehicle wheels on the market, it will be apparent that the attachment device 10 may be made and sold without the apertures 50 being drilled therein since different makes of vehicle wheels have different numbers of lug nuts and hence require a different number of apertures 50. Accordingly, in order to accommodate the different numbers of apertures 50 needed as well as the differing radial dispositions of the apertures 50, the attachment 10 may be sold with instructions to obtain by use of template the location and number of apertures.

In FIGURES 2 and 3, it will be seen that the winch drum assembly 16 is rotatably mounted on the cylindrical portion 46 of the supporting shaft assembly 44 said winch drum assembly 16 including a pair of side flanges 62 and 64 confining therebetween the cable 18 which is connected to the hub 66 of the drum. The hub 66 extends axially beyond the side flange 62 and is thereby exposed. A pair of diametrically disposed apertures 68 are provided in the exposed outer portion of the hub 66 of the winch drum, said apertures 68 being in radial alignment with a pair of apertures 70 located in the cylindrical portion 46 of the supporting shaft assembly 44 so that the shaft assembly 44 may be connected to the winch drum hub 66 by means of a bolt pin 72 extending through one set of apertures 68 and 70 and being held in its assembled position by means of a cotter pin 74. Accordingly, it will be observed that the connecting pin 72 is inserted from within the cylindrical member 46 of the supporting shaft assembly so that its exposed end may have the cotter pin 74 inserted thereinto. As a result thereof, the cotter pin 74 and connecting pin 72 may be easily withdrawn when desired so that the winch drum 16 will be rotatable relative to the supporting shaft assembly 44. As an alternative to the connecting pin 72 shown in FIGURE 3, a longer connecting bolt may be inserted through both sets of apertures 68 and 70 so that both ends are exposed with one of the exposed ends having a cotter pin 74 run therethrough, while the other end is headed. In connection with the foregoing, the utility of having the cable winch drum readily disconnected from the supporting shaft assembly 44 will be apparent to those having used a winch drum on the vehicle wheels for the purpose illustrated in FIGURE 1. Accordingly, when the cable is wound up upon the drum and the vehicle has yet not been completely withdrawn from its non- tractive location, unwinding of the cable will be made immediately possible by release of the cotter pin rather than necessitating backing up of the vehicle in order to loosen the cables.

As will be seen in FIGURES 2 and 3, the cylindrical portion 46 of the supporting shaft assembly 44 includes a second pair of diametrically disposed apertures 76. The second pair of apertures 76 are provided for the purpose of accommodating powered wheels of different types and dimentions. Therefore, from the foregoing description it will be readily appreciated that the attachment made in accordance with this invention is widely useful for many purposes and capable of being mounted on different makes of vehicle wheels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a powered vehicle traction wheel adapted to be mounted on a wheel brake drum by means of a plurality of bolts carried by the brake drum and extending through circumferentially spaced apertures in the traction wheel and brake drum, an attachable power wheel assembly comprising, removable shaft means, assembling means threadedly received on said bolts for operative engagement with said traction wheel to center and connect said traction wheel to the brake drum, shaft mounting means formed on said assembling means operatively engageable with said shaft means to mount said shaft means on said traction wheel with axial clearance relative to the traction wheel, said shaft means thereby extending outwardly from said wheel in axial alignment therewith, a rotatable device rotatably mountable on said shaft means, and disengageable connecting means operatively engageable with said shaft means and rotatable device having an exposed disconnection portion axially spaced from said traction wheel beyond the assembling means for enabling easy connection and disconnection between said shaft means and said rotatable device.

2. The combination as defined in claim 1, wherein said shaft means includes a tubular member, a mounting flange connected to one end of said tubular member, said tubular member having a plurality of axially spaced apertures through which said disengageable connecting means connects the shaft means to said rotatable device.

3. The combination as defined in claim 2, wherein said disengageable connecting means include apertures on the rotatable device axially spaced beyond said assembling means and alignable with apertures in the tubular member, a connecting pin extending through aligned apertures in the tubular member and rotatable device and having a headed end and an exposed end and a disconnectible cotter pin engageable with said exposed end to hold the connecting pin in assembled condition.

4. The combination as defined in claim 3, wherein said rotatable device comprises a winch drum.

5. The combination as defined in claim 1, wherein said rotatable device comprises a power take-off pulley.

6. The combination as defined in claim 1, wherein said rotatable device comprises a capstan.

7. In combination with a powered vehicle wheel assembly having a wheel rim adapted to receive a hub cap and a brake drum adapted to be connected to the wheel rim for rotation therewith, tubular mounting means having a mounting flange at one axial end thereof and connecting means at an opposite axial end thereof, spacing lug means connecting said wheel rim to the brake drum in coaxially centered condition and having a projecting portion in contact with the wheel rim extending axially therefrom within the confines of said hub cap when mounted on the wheel rim, means mounting said mounting flange in abutting engagement with said projecting portions of the spacing lug means in axially spaced relation to the wheel rim, and driven rotatable means mounted on said tubular mounting means and disconnectibly secured thereto by the connecting means in axially spaced relation to the mounting flange.

8. The combination of claim 7 wherein said connecting means includes axially spaced apertures formed in the tubular mounting means for accommodating driven rotatable means of different axial lengths and removable pin means radially extending through apertures in said driven rotatable means aligned with the apertures formed in the tubular mounting means to expose said pin means on that axial side of the driven rotatable means opposite the mounting flange from which it is axially spaced.

References Cited in the file of this patent
UNITED STATES PATENTS

| | | |
|---|---|---|
| 2,127,858 | Coleman | Aug. 23, 1938 |
| 2,527,634 | Grover | Oct. 31, 1950 |
| 2,642,235 | Smith | June 16, 1953 |
| 2,737,355 | Tourand | Mar. 6, 1956 |
| 2,946,564 | Cunningham | July 26, 1960 |